United States Patent [19]

Schneider

[11] Patent Number: 4,566,583
[45] Date of Patent: Jan. 28, 1986

[54] VESSEL SEPARATING APPARATUS FOR USE IN PARTICULAR IN VESSEL HANDLING MACHINES

[75] Inventor: Egon Schneider, Neutraubling, Fed. Rep. of Germany

[73] Assignee: Krones AG Hermann Kronseder, Maschinenfabrik, Neutraubling, Fed. Rep. of Germany

[21] Appl. No.: 710,537

[22] Filed: Mar. 11, 1985

Related U.S. Application Data

[63] Continuation of Ser. No. 407,181, Aug. 11, 1982, abandoned.

[30] Foreign Application Priority Data

Aug. 13, 1981 [DE] Fed. Rep. of Germany ....... 3132048

[51] Int. Cl.⁴ .............................................. B65G 47/26
[52] U.S. Cl. ..................................... 198/459; 198/659
[58] Field of Search ............... 198/459, 475, 659, 722, 198/625, 654

[56] References Cited

U.S. PATENT DOCUMENTS

| | | | |
|---|---|---|---|
| 2,692,671 | 10/1954 | Day et al. | 198/459 |
| 2,734,329 | 2/1956 | Fogle | 198/659 |
| 2,829,757 | 4/1958 | Breeback | 198/459 |
| 2,890,787 | 6/1959 | Carter | 198/459 |
| 3,323,635 | 6/1967 | Atkinson | 198/475 |

FOREIGN PATENT DOCUMENTS 1091940  4/1961  Fed. Rep. of Germany .
2618485 11/1977  Fed. Rep. of Germany .

Primary Examiner—Joseph E. Valenza
Assistant Examiner—Kyle E. Shane
Attorney, Agent, or Firm—Flynn, Thiel, Boutell & Tanis

[57] ABSTRACT

In a vessel separating apparatus for use in particular in vessel handling machines, the worm conveyor (6) which cooperates with a conveyor belt (1) and a lateral guide means (2) is provided at least in the entrance region thereof with a great number of resiliently yieldable individual elements in the form of bristles (15) which are arranged on a core (13) and define a thread (16) entering between the vessels. Thereby a high degree of damping of shocks exerted on the vessels in the entrance region and, thus, a low-noise, gentle transport of vessels are obtained. The core (13) with the differently long bristles (15) distributed regularly about its circumference and over its length is releasably connected to a worm body (9) made of a solid material so that it can be replaced easily and quickly, if necessary.

7 Claims, 3 Drawing Figures

VESSEL SEPARATING APPARATUS FOR USE IN PARTICULAR IN VESSEL HANDLING MACHINES

This application is a continuation of U.S. Ser. No. 407,181, filed Aug. 11, 1982, now abandoned.

FIELD OF THE INVENTION

The present invention relates to an apparatus for feeding vessels as set forth in the preamble of claim 1.

BACKGROUND OF THE INVENTION

An apparatus for separating bottles, etc., which uses a worm conveyor permits accurate feeding even under high performance conditions, simultaneously making it possible to increase the spacing distance in accordance with the requirements of the handling machine, which may be a filling or labelling machine, for example. A condition therefor is, however, that the vessels stand in a close line at the entry side of the worm conveyor and that there is a certain pressure caused by the accumulation of vessels at the entry side so that the vessels move on as continuously as possible into the "open" thread groove of the worm conveyor. Due to the play between the vessels and the worm conveyor or the guide means, respectively, which is indispensible to compensate for allowable variations in the vessel dimensions, heretofore a certain unsmoothness of the vessel movement before and at the entrance to the worm conveyor could not be avoided nevertheless, even if the thread design was optimal. This jerkiness causes adjacent vessels to bang each other or hit the worm conveyor and the guide means, which in turn results in a high emission of sound, so that the entrance to the worm conveyor of bottle handling machines represents a source of considerable noise. The noise level is particularly high, if the vessels being fed are not in full register with the initial pitch of the worm conveyor so that they meet the "closed" thread and are temporarily stopped. In this case, a great danger of fracture is incurred besides.

In one prior art apparatus of the type described hereinafore, the guide means is pivotally supported in the region adjacent the entrance to the worm conveyor and spring-biased (U.S. Pat. No. 2,692,671). If a vessel does not move into engagement with the worm conveyor accurately, the guide means can give way resiliently, whereby crushing or jamming of the respective vessel is avoided. Smoothening of the feed movement of the vessels and, thus, a reduction in sound emission cannot be obtained by such resilience of the guide means, however. Furthermore, in this prior art apparatus, the worm conveyor itself is made somewhat resilient in that a jacket of relatively hard rubber which forms the thread is mounted around a metal core. This provision also serves to avoid damaging of the vessels, especially scratching thereof. The sound emission caused by vessels banging each other may possibly be somewhat reduced by this worm conveyor also, but it is not possible thereby to smoothen the feed movement of the vessels, leave alone compensate for varying distances between the vessels being fed. Added to this is the fact that the resilient jacket will be destroyed by fed pieces of broken vessels or fractured bottles particularly quickly, since the pieces of broken vessels can get jammed between the jacket and the conveyor belt. Therefore, this prior art apparatus does not satisfy the practical demands with regard to service life and operating reliability.

In another prior art vessel separating apparatus, the guide means which is opposed to a worm conveyor is in the form of a second worm conveyor or a rotating roller (German Pat. No. 1,091,940) which corresponds to U.S. Pat. No. 2,890,787. In the exit region of the second worm, between the thread groove receiving the vessels or the end portion of the roller, respectively, spirally arranged bristles are mounted for urging the vessels into engagement with the thread groove of the worm conveyor, thereby giving stability to the vessels. These bristles have no conveying or spacing function whatsoever, nor are they capable of damping the shocks occurring at the entrance to the worm conveyor.

The task underlying the present invention is to provide an apparatus of the aforementioned type which has a sufficiently wear-resistant worm conveyor and enables substantially smooth and low-noise feed of vessels.

The apparatus according to the invention is distinguished over a worm conveyor having a one-piece jacket of resilient material in that greater resilience and increased wear-resistance can be obtained owing to the fact that the resilient jacket is divided into a great number of individually resilient separate elements made of a suitable material chosen for the purpose. It is easily possible to use materials having excellent wear resistance properties, such as metal or tough-elastic plastic, e.g. polyamides. Irrespective of this, the desired resilience can be influenced by the shape of the individual elements.

In a further embodiment, the individual elements themselves may easily be made of a hard material, the desired resilience then being provided by spring members. Each individual element can be separately mounted on the core by a spring member of its own or the individual elements may back against each other directly, with a spring member interposed respectively.

In a further embodiment, the lamellas are preferably made of tough-elastic plastic and are provided in the radially inner portions thereof with extensions acting as spacer members, whereby their edge portions which define the thread groove are freely movable.

One embodiment is particularly advantageous, namely, the resilient individual elements being movable in all directions so that the entrance region is resiliently yieldable in the direction of transport, in a direction transverse to the direction of transport and in the circumferential direction. Thereby, optimum shock absorption and, thus, a particularly smooth entry of vessels are enabled. Sufficient wear resistance can be obtained nevertheless, as, for instance, by using round bristles made of a polyamide material, and the apparatus becomes substantially insensitive to the feeding of pieces of broken vessels or fractured bottles and the improper feeding of vessels.

A particularly useful embodiment includes a two-part design of the screw conveyor which is normally quite sufficient to provide good shock absorption in the entrance area. The two-part design finds particular utility, if following the separation of vessels a strong acceleration to increase the distance takes place, which can be brought about by the rigid worm body alone.

One embodiment of the invention also affords considerable advantages in practical operation. In case of fatigue of the resilient elements, it is not necessary to replace the entire worm, but merely the entrance portion with the individual resilient elements, which is particularly susceptible to wear, etc., anyway. In this case, the solid worm body can be used much longer than conventional one-part worm conveyors, since it is stressed to a much lesser degree. A possible increased wear of the part disposed at the entrance side, which comprises the individual resilient elements, is more than compensated thereby.

Owing to the great yieldability of the entrance region, especially if bristle-like individual elements are used, the apparatus according to the invention can easily cope with minor deviations from the nominal separation or spacing of the vessels fed by the conveyor belt. In this apparatus, the operation of which involves particularly little noise, the accumulation pressure which is necessary to cause the bottles to close up is received by the gate member disposed upstream of the worm conveyor. This gate member can be, for instance, a star-shaped transport organ which rotates in synchronism with the worm conveyor and passes the vessels on to the worm conveyor in such a way that the vessels are already somewhat spaced and, thus, not in contact with each other. The gate member can be positioned either directly adjacent the conveyor belt that leads to the worm conveyor or adjacent another conveyor belt provided upstream of this conveyor belt and moving at a somewhat lower velocity. The vessels, which are already somewhat spaced when arriving at the worm conveyor, are received thereby gently and smoothly, even if the distance between them should have changed a little in the meantime, and the worm conveyor places them at the desired final distance which they have when arriving at the handling machine.

BRIEF DESCRIPTION OF THE INVENTION

Following is a description of various embodiments of the invention taken in conjunction with the drawings, in which FIG. 1 is a partly-sectioned top view of the feed means of a bottle handling machine;

FIG. 2 is a partly-sectioned view of a portion of the feed means according to FIG. 1 with a modified worm conveyor; and FIG. 3 is a top view of another embodiment of the feed means of a bottle handling machine.

DETAILED DESCRIPTION

Figure 1:
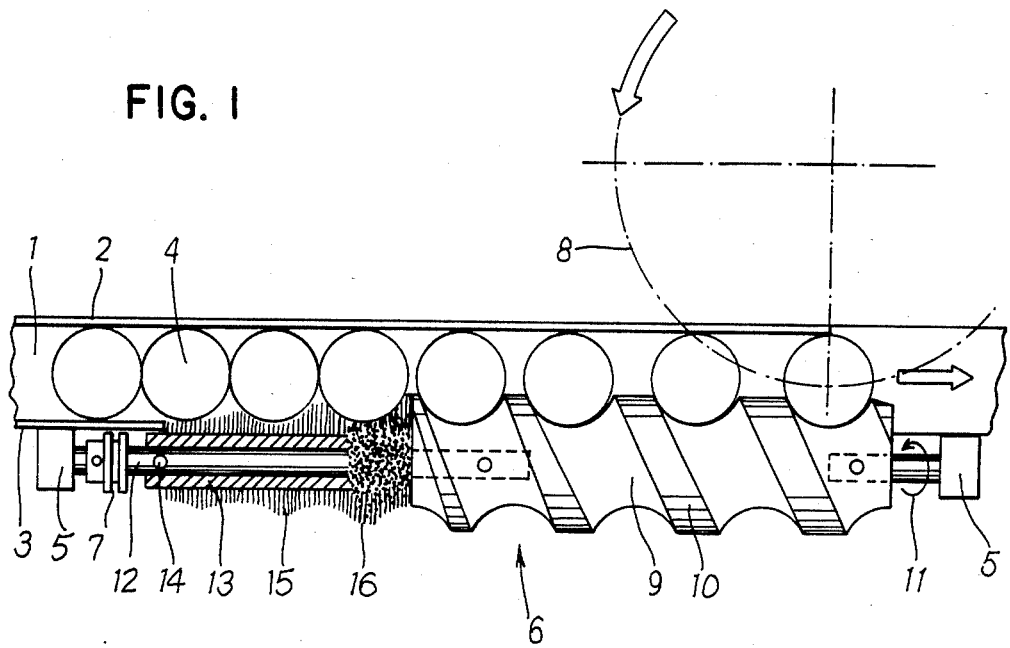

The vessel separating apparatus according to FIG. 1 is integrated in a bottle handling machine shown in part only. It comprises a conveyor belt 1 continuously driven in the direction of the arrow and having a horizontal surface and lateral guide elements 2, 3. The bottles 4 to be handled are fed on the conveyor belt with no distance provided between the bottles. On the side of the conveyor belt 1 opposite to guide element 2 a worm conveyor 6 is provided, which is rotatably supported by two bearing blocks 5. The worm conveyor 6 is driven in the direction of the arrow in synchronism with the conveyor belt 1 by means of a sprocket wheel 7 such that its transport velocity in the entrance region is slightly less than the transport velocity of the conveyor belt 1. Thus, a certain accumulation pressure is exerted on the bottles 1 as a result of the fact that the conveyor belt 1 travels on underneath the bottles. After having been separated by the worm conveyor 6 and spaced or accelerated, respectively, to match the machine pitch, the bottles 4 are taken over by a star-shaped receiving member 8, of which only the graduated circle is shown in the drawing, which rotates in the direction of arrow in synchronism with the worm conveyor 6.

The worm conveyor 6 has in its central and end portions a solid worm body 9 made of a wear-resistant plastic material which is provided with a thread 10 of increasing lead. The areas between the thread 10 are curved to match the circular cross-sectional contour of the bottles 4, thereby forming feed pockets of approximately semicircular cross-sectional configuration traveling in the direction of feed and having a final pitch corresponding to the pitch of the start-shaped receiving member 8. In the end of the worm body 9 facing in the direction of feed a short shaft 11 is mounted which is rotatably supported by the associated bearing block 5. In the other end of the worm body 9 facing in a direction opposite to the feed direction a shaft 12 is mounted whose free end is rotatably supported by the associated bearing block 5 and carries the sprocket wheel 7. The shaft 12 carries a tubular core 13 which is releasably secured thereto by means of a pin 14 such that the core 13 directly engages the planar end face of the worm body 9. A great number of radially extending bristles 15 are regularly distributed about the circumference of the core 13 and over the length thereof to form a circular brush, and are secured to the core 13. The bristles are made of polyamide and have a diameter of, for instance, 1 to 3 mm depending on the size of the bottles and the desired damping properties. The length of bristles varies so as to form a thread 16 with rounded portions formed therebetween to provide feed pockets for the bottles 4, as is similarly the case with the worm body 9. The thread 16 or flights thereof gradually force their way between the incoming bottles 4. The bottles then merge smoothly into the thread 10 of the worm body 9. Owing to the universal flexibility of the bristles 15 forming a resilient jacket the incoming bottles 4 are received by the worm conveyor 6 most gently, even when they do not accurately enter into the "open" thread groove. The production of noise is accordingly low and damaging or breaking of bottles is safely prevented. The distance between the guide element 2 and the deepest point of the rounded groove between the thread 16 may be made a little smaller than the diameter of the bottles 4. In this case, the bottles are quasi elastically clamped between the guide element 2 and the worm conveyor 6, whereby they are held in position particularly accurately.

If after a protracted time of operation the damping action of the worm conveyor 6 has become unsatisfactory due to a permanent set or a decline in the resilience of the bristles 15, it is by no means necessary to replace the entire worm conveyor. After removing the worm conveyor 6 it is merely necessary to remove the pin 14 and withdraw the brush insert, which consist of the core 13 and the bristles 15, from the shaft 12 and replace it by a new brush insert. The new brush insert is fastened by the pin 14, whereupon the worm conveyor 6 is ready again for assembly.

The production of the bristle-type worm consisting of the core 13 and the bristles 15 involves no problems. As a starting material a cylindrical circular brush having a sufficiently great outer diameter is used, whose bristles are given stability by casting a soluble bonding agent such as molten wax therebetween. Thereupon the desired thread profile can be produced by machining on a worm cutting machine in a conventional manner. After the cutting operation the bonding agent is removed as by heating the bristle-type worm in a water bath, whereupon the bristle-type worm is ready for use. A bristle-type worm produced that way is fully equivalent to a conventional solid worm as regards accuracy to gauge.

Figure 2:
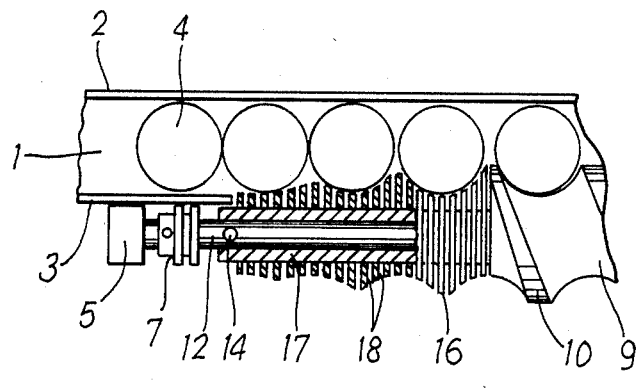

The apparatus according to FIG. 2 comprises a core 17 made of a tough-elastic wear-resistant plastic, such as polyamide, which is mounted on a shaft 2 and provided with a great number of radially extending lamellas 18 formed integrally therewith. The thickness of the lamellas 18 and their distance from each other are chosen such that there is provided, on the one hand, the desired yieldability in the feed direction and, on the other hand, sufficient closeness of the worm surface to ensure accurate guidance of the bottles 4. The outer contour of the jacket formed of lamellas 18 is equal to the outer contour of the jacket according to FIG. 1, which is formed of bristles 15, i.e. the edges of the lamellas 18 define a thread 16 which gradually enters between the bottles and merges continuously into the thread 10 of the worm body 9. As for the rest, the designs of the apparatus according to FIG. 2 and the apparatus according to FIG. 1 are alike. The effects are also substantially equal. There is merely a difference in that the individual elements in the form of the lamellas 18 lack resilience in the circumferential direction. Production can also be facilitated by filling the spaces between the lamellas prior to the worm cutting operation.

Figure 3:
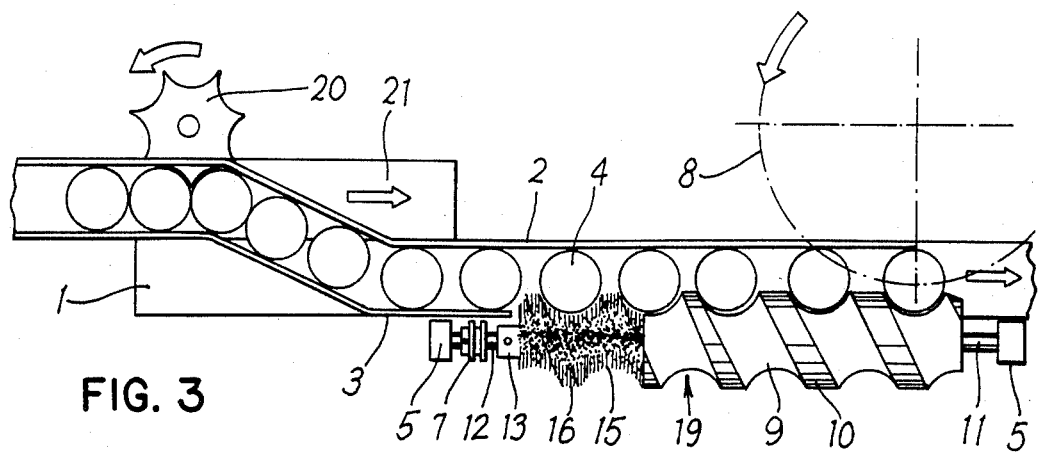

The vessel separating apparatus according to FIG. 3 is also partly identical to the apparatus according to FIG. 1. Therefore, only the differences will be explained hereinbelow. An essential feature resides in the fact that the initial pitch or lead of the worm conveyor 19 in the region of the bristles 15, which are mounted on a tubular core 13, is greater than the bottle diameter. Therefore, the bottles 4 must already be spaced from each other a certain amount as they are fed. To this end, a star-shaped transport member 20 which is driven in the direction of the arrow in synchronism with the worm conveyor 19 is disposed upstream of the worm conveyor 19. The pockets of the transport member 20 are designed to provide accurate meshing with the bottles 4 which arrive in a close line. Spacing of the bottles 4 an amount equal to the initial pitch of the worm conveyor 19 is effected in that the conveyor belt 1 provided after the star-shaped transport member 20 moves at a velocity precisely equal to the starting velocity of the worm conveyor 19. Therefore, the star-shaped transport member 20 can be disposed directly adjacent the conveyor belt 1. To produce litle noise, however, it is more favorable to provide upstream of the conveyor belt 1 another conveyor belt 21 traveling at a somewhat lower speed and to locate the star-shaped transport member 20 adjacent this conveyor belt 21. The accumulation pressure exerted on the star-shaped transport member is reduced thereby. The transfer of bottles from the leading conveyor belt 21 onto the conveyor belt 1 is caused by suitably designed guide elements 2 and 3. In this apparatus, no accumulation pressure is exerted on the worm conveyor 19. The accumulation pressure is removed by the star-shaped transport member 20 in conjunction with the higher-velocity conveyor belt 1. The worm conveyor 19 merely serves the purpose to increase the distance between the bottles until it equals the handling machine pitch. Minor deviations from the nominal distance between incoming bottles which may possibly occur when the bottles are transferred from the conveyor belt 21 to the conveyor belt 1 are compensated by the thread 16 at the entrance to the worm conveyor 19 which is formed of resilient bristles 15. The noise production of this apparatus is extremely low. On the other hand, the service life is very long owing to the fact that only little stress is exerted on the worm conveyor 19.

What is claimed is:

1. A vessel separating apparatus for use in particular in vessel handling machines, comprising:
   a conveyor belt;
   a lateral guide means along one side of said conveyor belt and a worm conveyor along an opposite side of said conveyor belt;
   said worm conveyor being provided at least in the entrance region thereof with a rigid core having a resilient jacket thereon consisting only of a plurality of radially extending, resiliently flexible bristles, the inner ends of which are secured to said core, the outer ends of which are formed to a worm conveyor thread, the flights of which are adapted to enter between said vessels to effect a conveyance of said vessels in response to a rotation of at least said entrance region of said worm conveyor, all of said radially extending flexible bristles being made of the same flexible material so that the radially outermost ends of said bristles forming said worm conveyor thread are capable of yielding in the event that one of said vessels is temporarily wedged between said worm conveyor thread and said laterial guide means.

2. An apparatus according to claim 1, wherein said bristles are regularly distributed about the entire circumference and over the entire length of said core.

3. An apparatus according to claim 1, wherein axially adjoining said core carrying said bristles, there is provided a worm body of solid material having thread flights thereon adapted to extend between said vessels.

4. An apparatus according to claim 3, wherein said core carrying said bristles is releasably connected to said worm body.

5. An apparatus according to claim 4, wherein said core is of tubular shape and releasably mounted on a shaft connected to said worm body.

6. An apparatus according to claim 1, wherein the initial lead or the initial pitch, respectively, of said thread flights of said worm conveyor formed by said bristles is greater than the distance between the centers of said vessels when contacting each other, and wherein upstream of said worm conveyor a gate member operating in synchronism with said worm conveyor is provided which feeds said vessels by cooperation with said conveyor belt so that said vessels are spaced from each other a distance corresponding to said initial pitch of said worm conveyor.

7. An apparatus according to claim 6, wherein said gate member is a star-shaped transport member driven in synchronism with said worm conveyor, the pocket pitch of said gate member corresponding to the center-to-center distance of vessels contacting each other, and wherein said conveyor belt is adapted to travel at a velocity corresponding to the feed velocity provided by said entrance region of said worm conveyor.

* * * * *